United States Patent [19]

Donnelly et al.

[11] 4,440,192

[45] Apr. 3, 1984

[54] MINIMIZATION OF PRESSURE DROP VARIATION IN FLOW CONTROLLERS

[75] Inventors: Brian G. Donnelly, West Suffield, Conn.; Charles F. Stearns, East Longmeadow, Mass.

[73] Assignee: United Technologies Corporation, Hartford, Conn.

[21] Appl. No.: 421,759

[22] Filed: Sep. 23, 1982

[51] Int. Cl.$^3$ .............................................. G05D 7/01
[52] U.S. Cl. .................................. 137/501; 137/468
[58] Field of Search ............... 137/468, 500, 501, 503, 137/504

[56] References Cited

U.S. PATENT DOCUMENTS

| | | | |
|---|---|---|---|
| 2,561,214 | 7/1951 | Matson et al. | 277/37 |
| 2,580,127 | 12/1951 | Renick | 137/153 |
| 2,601,870 | 7/1952 | Lee | 137/490 |
| 2,622,614 | 12/1952 | Cox | 137/500 |
| 2,704,087 | 3/1955 | Lindsay | 137/119 |
| 2,750,929 | 6/1956 | Bronson | 121/44 |
| 2,821,996 | 7/1958 | Stevenson | 137/490 |
| 2,870,781 | 1/1959 | Tennis | 137/490 |
| 2,922,400 | 1/1960 | Lorence | 121/41 |
| 3,006,372 | 10/1961 | Ruhl | 137/622 |
| 3,013,539 | 12/1961 | Rethmeier | 121/157 |
| 3,027,880 | 4/1962 | Van Den Bussche | 121/157 |
| 3,152,610 | 10/1964 | McAfee, Jr. | 137/596.2 |
| 3,198,212 | 8/1965 | Junck et al. | 137/625.37 |
| 3,262,467 | 7/1966 | Stacey | 137/596.2 |
| 3,332,436 | 7/1967 | Welty | 137/468 |
| 3,581,772 | 6/1971 | Wills | 137/625.69 |
| 3,643,685 | 2/1972 | Hays | 137/501 |
| 3,667,722 | 6/1972 | Katz et al. | 251/30 |
| 3,724,494 | 4/1973 | Alber | 137/501 |
| 3,881,459 | 5/1975 | Gaetcke | 123/188 R |
| 4,004,610 | 1/1977 | Theriot | 137/614.17 |

FOREIGN PATENT DOCUMENTS 2347316 9/1973 Fed. Rep. of Germany ...... 137/501

*Primary Examiner*—Robert G. Nilson
*Attorney, Agent, or Firm*—John Swiatocha

[57] ABSTRACT

Variations in pressure drop set by an inline pressure regulating valve (70) are minimized by a spring (97) having a rate which is a select function of certain characteristics of the geometry of the flow controller and the fluid flows required to be handled thereby.

2 Claims, 4 Drawing Figures

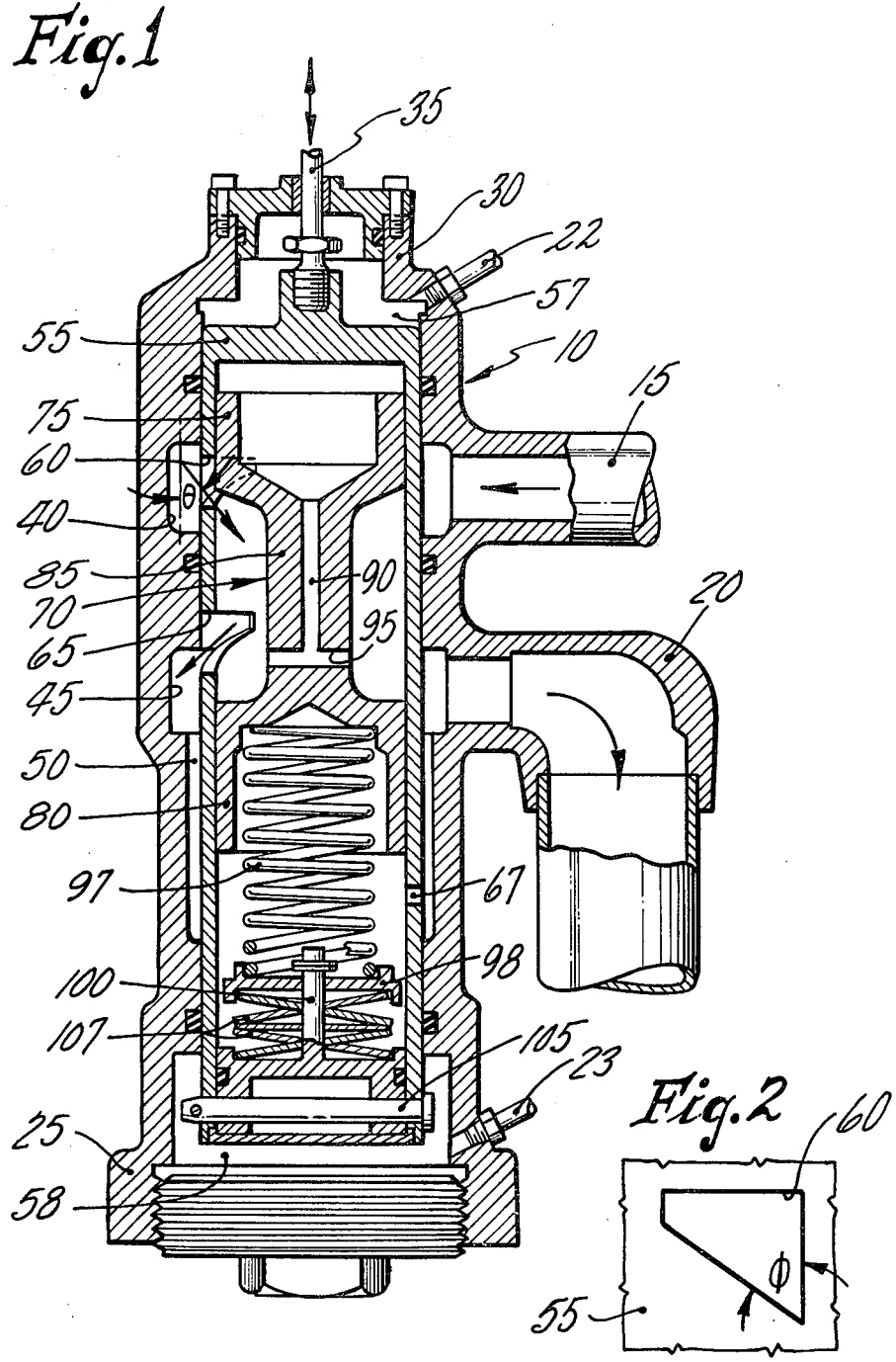

MINIMIZATION OF PRESSURE DROP VARIATION IN FLOW CONTROLLERS

CROSS REFERENCE

This invention relates to U.S. patent application Ser. Nos. 421,758 and 421,760, filed of even date herewith.

DESCRIPTION

1. Technical Field

This invention relates generally to flow control devices and specifically to the minimization of inlet pressure and flow level sensitivity in such devices.

2. Background Art

It is well known that volumetric fluid flow rate through a conduit depends on both the flow area of the conduit and the pressure drop thereacross. Accordingly, in establishing a desired volumetric fluid flow rate by means of a flow control device, it is necessary to regulate not only the cross-sectional flow area of the device, but also the pressure drop thereacross. In apparatus such as hydromechanical fuel controls for gas turbine engines, it is desirable to vary engine fuel flow in response to an input to the fuel control, such input being, for example, movement of a linkage or the like by a corresponding movement of a power lever or similar control input device. In the past, it has been the practice to provide such hydromechanical fuel controls with a metering (throttle) valve and a pressure regulating valve, each housed separately in its own casing, the pressure regulating valve maintaining what is sought to be a constant pressure drop across the metering valve so that a desired flow may be obtained by control of a single variable: flow area. For enhanced compactness, flow controllers having both pressure regulating and metering valves in a single casing have been developed. Such a flow controller is disclosed and claimed in U.S. patent application Ser. No. 421,758 filed in the name of Herbert W. Tutherly of even date herewith.

In a flow controller such as that described in the above-noted patent application, the pressure drop across the metering valve is sought to be maintained by applying pressures upstream and downstream of windows in the metering valve element to opposite ends of the pressure regulating valve element and balancing the resultant force on the pressure regulating valve element with a reaction force from a preloaded spring. In such an arrangement, without the benefit of the present invention, flow forces (velocity effects, the magnitude of which are determined by the fluid pressure and rate of flow through the controller) associated with fluid flow through the controller could cause undesirable disturbances in the setting of the pressure regulating valve element. Such disturbances would in turn cause generally undesirable variations in pressure drop across the metering valve element and therefore in the output of the controller.

While in certain applications such variations in pressure regulating valve element setting may be tolerated, in other applications, such as in gas turbine engine fuel controls, wherein precise maintenance of pressure drop set by the pressure regulating valve element is required, it has been the practice to employ bypass pressure regulating valves which typically adjust flow to the controller in response to the output therefrom. Therefore, a significant portion of the input to the flow controller must be returned to the bypass pressure regulating valve and thus, the pump employed to supply the flow controller must be of large enough capacity to provide sufficient flow for use by the bypass valves as well as for whatever use the main flow is required. Furthermore, bypass regulators usually require a positive displacement pump and are therefore generally unacceptable where centrifugal pumps are contemplated. Bypass regulating valves also require a certain flow controller discharge geometry which may render the flow controller overly bulky for its intended use.

DISCLOSURE OF INVENTION

Therefore, among the objects of the present invention is the provision of a flow controller wherein flow variations associated with conditions interiorly of the controller and variations in inlet pressure thereto are minimized.

In accordance with the present invention, the value of the spring rate (constant) associated with the spring which balances the pressure regulating valve element against the fluid pressures applied to the ends thereof, is selected to allow the spring to balance the flow forces on the pressure regulating valve element as well. The spring constant is substantially equal to twice the product of the maximum required pressure drop across the flow controller, the cosine of the angle through which flow is turned by the pressure regulating valve element and the quotient of the flow (unobstructed) area of a metering valve window and the maximum required stroke of the pressure regulating valve element. The metering valve element may comprise a generally tubular member including inlet and outlet windows therein corresponding to and communicating with fluid inlet and outlet passages in the casing. As the metering element is selectively positioned within the casing, one of the windows thereof is disposed in variable registry with a corresponding casing passage for adjusting the effective flow area therebetween. The pressure regulating valve comprises a spool-type valve reciprocable within the metering valve and including a first portion in variable registry with the other metering window for controlling fluid pressure across the flow controller. Two opposed ends of the pressure regulating valve element communicate with fluid pressure across the one metering valve window, the force exerted by the biasing spring having the spring rate set forth hereinabove balancing the difference in fluid pressures applied to the ends of the pressure regulating valve element whereby flow through the flow control device may be selectively set by adjustment of the position of the metering element only.

BRIEF DESCRIPTION OF DRAWINGS

FIG. 1 is a view in cross section of the flow control device of the present invention.

FIG. 2 is a fragmentary elevation of an inlet window of the flow control device.

BEST MODE FOR CARRYING OUT THE INVENTION

Figure 3:
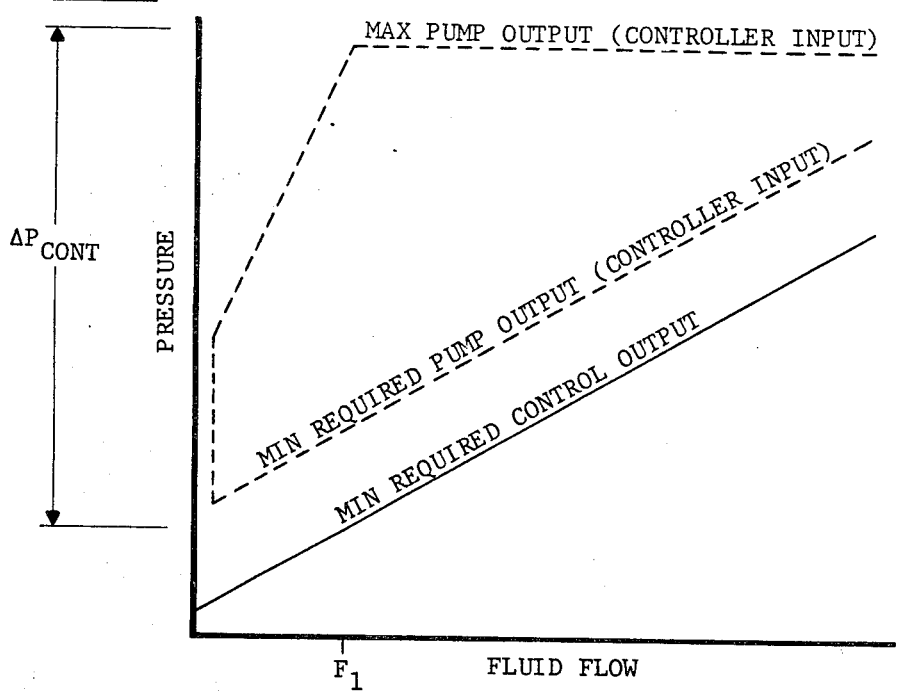
FIG. 3 is a plot of pressure vs. flow input to and exhausted from the flow controller embodying the present invention.

Referring to FIG. 1, there is shown a flow controller comprising a housing (casing) 10 provided with inlet and outlet passages 15 and 20, respectively, and servo ports 22 and 23. As shown, housing 10 is generally cylindrical, being closed at end 25 thereof and open at opposite end 30 to receive output or feedback rod 35, the position of which being indicative of the controller setting. Fluid input to the flow control device from inlet passage 15 flows through an annular extension 40 of the inlet passage and is exhausted from the device through annular extension 45 of outlet passage 20. Annular extension 45 also communicates with a thin annular passage 50 by which outlet pressure is maintained at the lower end of the control device as explained in greater detail hereinbelow.

Metering valve element 55 is received within casing 10 defining therewith, at the ends thereof, chambers 57 and 58. Element 55 is connected at one end thereof to shaft 35 for the longitudinal movement thereof. As shown metering valve element 55 is closed at opposed ends thereof and is of generally hollow, cylindrical shape. The metering element is provided with at least one inlet window 60 therein, in fluid communication with annular extension 40 for pressurization of the interior of metering element 55 with fluid provided to the flow controller through inlet conduit 15. Of course, plural inlet valve windows 60 may be employed as dictated by desired valve size and required flow capacity. A plurality of such windows would be disposed circumferentially about the valve element in alignment with the window illustrated and in communication with annular extension 40. As used herein, the expression "inlet valve windows" shall refer collectively to all inlet valve windows employed. Metering valve element 55 also includes at least one outlet window or opening 65 in fluid communication with annular extension 45 for accommodating flow exhausted from the interior of metering element 55 to the outlet conduit 20. It will be understood that a plurality of outlet windows may be employed in circumferential alignment with the illustrated window as dictated by valve size and expected flows. As used herein, the expression "outlet valve window" shall refer collectively to all outlet valve windows employed.

Metering valve element 55 also includes an aperture 67 through a sidewall thereof, aperture 67 providing fluid communication between thin annular passage 50 (and outlet passage 20) and the interior of valve element 55 at the lower end thereof.

A pressure regulating valve element 70 is disposed interiorly of metering valve element 55 and is longitudinally reciprocable therewithin. Pressure regulating valve element 70 may be a spool-type valve element including at the ends thereof, a pair of spaced, concave lands 75 and 80 disposed at opposite ends of a reduced diameter, median portion 85. A first portion (land 75) of valve element 70 is disposed in variable registry with inlet window 60 in metering valve element 55. Median portion 85 is bored at 90 and 95, these bores providing fluid communication between that portion of the interior of metering valve element 55 surrounding the median portion with the interior of land 75. The interior of land 80 is pressurized with fluid at outlet pressure by means of communication of the interior of the lower end of metering valve element 55, annular extension 45, annular passage 50 and aperture 67.

Pressure regulating valve element 70 is biased upwardly by a spring 97 interposed between land 80 of the pressure regulating valve element and spring retainer 98 which is slidably disposed on retainer guide 100 pinned to the lower portion of metering valve element 55 by pin 105. A plurality of concavo-convex bimetallic discs 107 may be disposed between retainer 98 and the base of guide 100 for adjusting the preload of spring 97 in response to the temperature of the fluid handled by the flow controller for minimizing the dependence of controller performance on fluid temperature.

In operation, an input signal to the flow controller is provided by hydraulic fluid admitted to the controller through passages 22 and 23 thereby selectively pressurizing one of chambers 57 and 58 to move valve element 55 rectilinearly. Such movement of valve element 55 within housing 10 places the outlet valve window 65 in select variable registry with annular extension 45 of the outlet passage thereby modulating the effective flow area between extension 45 and the outlet windows. Pressurized fluid provided by, for example, a suitable pump (not shown) enters casing 10 through conduit 15, annular extension 40, inlet window 60 and along the surface of median portion 85 to outlet valve window 65. Inlet valve windows 60 are dimensioned and located so as to remain unblocked by any portion of casing 10. Thus, the effective outlet flow area of the flow control device is determined by the extent of registry of outlet window 65 with annular extension 45.

As set forth hereinabove, to accurately control fluid flow it is required to control not only the effective flow cross-sectional area of the device but the pressure drop thereacross. In the present invention, the pressure drop across outlet window 65 is maintained at a predictable value by pressure regulating valve element 70 whereby flow through the device is effectively controlled by a single input: the setting of metering valve element 55.

A first portion (land 75) of the pressure regulating element is disposed in registry with inlet window 60. Thus, it is seen that fluid pressure at the interior of metering valve element 55 between windows 60 and 65 (at the interior of outlet windows 65) is determined by the amount of this registry between, or in other words, the amount of blockage of inlet window 60 by land 75. Fluid pressure downstream of windows 65 is essentially outlet pressure. To maintain a predictable pressure drop across window 65, outlet pressure is applied to the interior (end face) of land 80 through annular extension 45, annular passage 50 and opening 67 in metering valve element 55. Fluid pressure adjacent outlet windows 65 interiorly of metering valve element 55 (upstream of window 65) is applied to the interior (end face) of land 75 through bores 90 and 95.

Accordingly, the pressure drop across outlet window 65 is applied to opposite ends of the pressure regulating valve element and opposed by spring 97. Assuming that a desired flow is being maintained by the flow controller and it is desired to increase that flow, hydraulic fluid admitted through port 22 will cause the metering valve element to move downwardly. This will increase the amount of registry (overlap) between window 65 and annular extension 45 thereby increasing flow to outlet passage 20. Regulation of pressure is provided by pressure regulating element 70 and spring 90 which maintains the predicted pressure drop across the outlet window 65.

As set forth hereinabove, flow forces acting on the pressure regulating valve element can disturb that valve element from the position or setting thereof corresponding to the desired controller flow output. As fluid enters the metering valve element through window 60, it is accelerated, and substantial portions of fluid pressure are converted into dynamic pressure which acts on land 80 tending to urge the pressure regulating valve element down. Before the flow exits the metering valve element through window 65, it is decelerated, substantial portions of this dynamic pressure being converted to total pressure acting on both lands 75 and 80. Thus, the pressure forces on land 80 are of greater magnitude than those on land 75 and there is a net force (downwardly) tending to displace the pressure regulating valve element thereby disturbing the pressure from that required to be held by the pressure regulating valve element to achieve the desired controller output.

It has been determined that a judicious selection of the spring constant of spring 97 can minimize the adverse effects of the flow forces. In accordance with the present invention, the spring rate or spring constant selected is a function of flow controller geometry and the characteristics of flow through the controller and is approximately equal to the product $$2A/X \cos \theta \, \Delta P_{cont}$$

wherein:
A is the actual flow area of metering valve window 60 at maximum flow through the flow controller (that portion of window 60 unobstructed by the regulating valve element land 75);
X is the maximum stroke of the pressure regulating valve element at maximum flow through the flow controller;
$\theta$ is the measure of the angle through which the flow is turned by the pressure regulating valve as it is exhausted from window 60 as measured from the direction of the longitudinal axis of the pressure regulating valve element; (see FIG. 1) and
$\Delta P_{cont}$ is the maximum pressure drop across the flow controller.

In determining the values of the terms of the above-set forth expression, A, the unobstructed area of window 60 at maximum flow through the flow controller is readily calculated based on the geometry of the flow controller and the maximum flow required to be handled thereby. Where window 60 is of triangular shape as may be the case for optimum stability of the pressure regulating valve element, the term 2A/X reduces to X tan $\phi$ wherein $\phi$ is the angular measure of the unobstructed portion of that triangular window as illustrated in FIG. 1.

X, the maximum stroke of the pressure regulating valve element at maximum flow through the flow controller is, like the area term, A, readily calculated from the geometry of the flow controller and the maximum required flow therethrough throughout the operating envelope thereof.

Likewise, $\theta$, the angle through which the flow is turned by the pressure regulating valve element is also readily calculable from the geometry of the flow controller selected.

The term $\Delta P_{cont}$, is calculable from the characteristics of the flow applied to the flow controller through duct 15 and the desired pressure downstream of the flow controller (controller output). Referring to FIG. 3, there are illustrated plots of pressure vs. fluid flow for both the input to and output from the flow controller. With regard to the plot of input to the controller, for purposes of illustration, this plot is characteristic of a centrifugal pump as would be used, for example, to supply fuel to gas turbine engines. The output plot is illustrative of minimum pressure required from the flow controller for various flows therethrough. Accordingly, it is seen that the maximum pressure drop required across the flow controller ($\Delta P_{cont}$) is the maximum difference between the maximum pump output curve and the minimum controller output curve at flow $F_1$.

Figure 4:
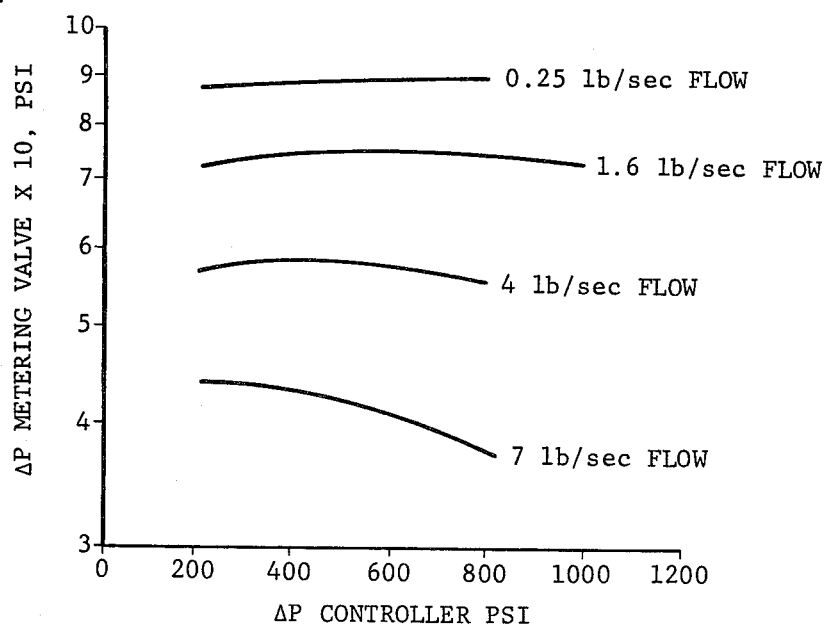
FIG. 4 is a plot of pressure drop across a metering valve portion of the controller against pressure drop across the entire controller for various flows.

Referring to FIG. 4, there are shown plots of pressure drop across the metering valve window against pressure drop across the entire controller for various controller output flows in a particular application of the present invention. It is noted from FIG. 4 that by providing the controller spring with a spring rate (stiffness) in accordance with the present invention, pressure across the metering valve window remains relatively constant at constant flow despite severe variations in pressure drop across the entire controller due to, for example, normal variations in pump output (controller input) pressure. However, it will be noted that as flow increases the pressure drop across the metering valve window decreases or "droops" due at least in part to the stiffness of spring 97. Since it is desired to control flow with controller 10 by setting flow area (and not pressure) of the controller, such droop, if left uncorrected, would adversely affect the accuracy with which the controller sets flow. However, such droop is readily compensated for by judicious selection of metering valve window geometry. Those skilled in the art will recognize that flow through a conduit is governed by the following expression $$Q = KA\sqrt{\Delta P}$$

where
Q = flow
K = constant
A = conduit area
$\Delta P$ = pressure difference across conduit.

Thus, it is noted that the droop in pressure drop across the metering valve window for increasing flow through the controller may be compensated for by an additional increase in metering valve window area with increased flow settings. As illustrated in FIGS. 1 and 2 such an increase in area is achieved by contouring the shapes of windows 65.

While the flow control device of the present invention has been illustrated and described as having outlet pressure applied to one of the ends of the pressure regulating valve element and the pressure regulating valve adjusting the effective area of the inlet valve window, it will be understood that alternate equivalent arrangements are contemplated. Thus, it will be understood that without departing from this invention, inlet pressure may be applied to an end of the pressure regulating element while the pressure regulating element may adjust the effective area of the outlet valve window.

Having thus described the invention what is claimed:
1. A flow controller comprising a housing having fluid inlet and outlet passages therein,
   a metering valve element having inlet and outlet windows therein corresponding to said inlet and outlet passages, said metering valve element being disposed in said housing such that at least one of said metering valve windows is in variable registry with a corresponding passage for adjusting the effective flow area therebetween,
   a pressure regulating valve element disposed within said metering valve element, a first portion of said pressure regulating valve element being in variable registry with the other of said metering valve windows, an unobstructed portion of said other window allowing flow therethrough, said pressure regulating valve element being pressurized on opposite ends thereof with fluid pressure on opposite sides of said one metering valve window and biased by a spring which balances the net force on said pressure regulating valve element due to any difference in pressure on the opposite ends thereof, said flow control device being characterized by the spring having a spring rate substantially equal to the product $$2A/X \cos \theta \, \Delta P_{cont}$$

wherein:

A is the flow area of said other window at a maximum required flow through the controller;

X is the maximum stroke of said pressure regulating valve element at said maximum required flow through said controller;

$\theta$ is the angle through which the flow through the controller is turned by the pressure regulating valve element; and $\Delta P_{cont}$ is the maximum required pressure drop across said flow controller.

2. The flow control device of claim 1 characterized by said flow area of said other window being of angular shape and said spring rate is substantially equal to $$X \tan \phi \cos \theta \Delta P_{cont}$$

wherein:

$\phi$ is the angular measurement of the unobstructed window portion.

* * * * *

UNITED STATES PATENT AND TRADEMARK OFFICE
CERTIFICATE OF CORRECTION

PATENT NO. : 4,440,192
DATED : April 3, 1984
INVENTOR(S) : BRIAN G. DONNELLY ET AL It is certified that error appears in the above-identified patent and that said Letters Patent is hereby corrected as shown below:

Column 5, line 20, "2A/X cos θ $\Delta P_{cont}$" should be $$-- \frac{2A}{X} \cos \theta\, \Delta P_{cont} --.$$

Column 7, line 16, "2A/X cos θ $\Delta P_{cont}$" should be $$-- \frac{2A}{X} \cos \theta\, \Delta P_{cont} --.$$

Signed and Sealed this

Sixteenth Day of October 1984

[SEAL]

Attest:

GERALD J. MOSSINGHOFF

*Attesting Officer*  *Commissioner of Patents and Trademarks*